United States Patent
Wei et al.

(10) Patent No.: US 9,602,951 B2
(45) Date of Patent: Mar. 21, 2017

(54) METHOD OF HANDLING RESOURCE EXCHANGE AND RELATED COMMUNICATION DEVICE

(71) Applicant: ACER INCORPORATED, New Taipei (TW)

(72) Inventors: Hung-Yu Wei, New Taipei (TW);
Chih-Yu Wang, New Taipei (TW);
Ching-Chun Chou, New Taipei (TW);
Guan-Yu Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 187 days.

(21) Appl. No.: 14/191,386

(22) Filed: Feb. 26, 2014

(65) Prior Publication Data

US 2014/0247779 A1 Sep. 4, 2014

Related U.S. Application Data

(60) Provisional application No. 61/771,343, filed on Mar. 1, 2013.

(51) Int. Cl.
*H04W 4/00* (2009.01)
*H04W 72/08* (2009.01)

(52) U.S. Cl.
CPC ......... *H04W 4/005* (2013.01); *H04W 72/087* (2013.01)

(58) Field of Classification Search
CPC ............................. H04W 72/04; H04W 72/08
See application file for complete search history.

(56) References Cited

U.S. PATENT DOCUMENTS

2009/0245085 A1   10/2009   Tao
2014/0094183 A1*   4/2014   Gao ................... H04W 72/048
                                                        455/450

FOREIGN PATENT DOCUMENTS

WO   2011069295 A1   6/2011
WO   2012159270 A1   11/2012

OTHER PUBLICATIONS

Shaoyi Xu et al, Effective Interference Cancellation Scheme for Device-to-Device Communication Underlaying Cellular Networks, 2010, XP031770548, IEEE.

* cited by examiner

*Primary Examiner* — Hassan Phillips
*Assistant Examiner* — Omeed D Rahgozar
(74) *Attorney, Agent, or Firm* — Winston Hsu; Scott Margo

(57) ABSTRACT

A method of handling a resource exchange for a network comprises the steps of receiving at least one channel information report transmitted by at least one communication device pair, respectively; determining at least one resource exchange according to the at least one channel information report; and performing the at least one resource exchange on at least one first resource allocated to the at least one communication device pair and on at least one available resource at the network, to allocate at least one second resource to the at least one communication device pair.

15 Claims, 10 Drawing Sheets

| Preference | 1st | 2nd | 3rd | 4th | 5th |
|---|---|---|---|---|---|
| CDP1 | R2 | R1 | R3 | R4 | R5 |
| CDP2 | R4 | R2 | R1 | R3 | R5 |
| CDP3 | R2 | R3 | R1 | R4 | R5 |
| VO1 | R1 | R2 | R3 | R4 | R5 |
| VO2 | R2 | R3 | R4 | R5 | R1 |

FIG. 10

METHOD OF HANDLING RESOURCE EXCHANGE AND RELATED COMMUNICATION DEVICE

CROSS REFERENCE TO RELATED APPLICATIONS

This application claims the benefit of U.S. Provisional Application No. 61/771,343, filed on Mar. 1, 2013 and entitled "Radio Resource Management for Device-to-Device Communications", the contents of which are incorporated herein in their entirety.

BACKGROUND OF THE INVENTION

1. Field of the Invention

The present invention relates to a method used in a wireless communication system and related communication device, and more particularly, to a method of handling a resource exchange and related communication device.

2. Description of the Prior Art

In traditional communication systems, especially wireless communication systems, two communication devices communicate with each other via a base station, i.e., the base station is an intermediate entity between the communication devices. Such a scenario is inefficient in aspects of coverage area, resource utilization and transmission delay, especially when the communication devices are close to each other and are able to communicate with each other directly.

Thus, device-to-device (D2D) communication is proposed, and a coverage area of the base station, the resource utilization and/or the transmission delay may thus be improved. For example, the D2D communication may be realized, after an initialization (e.g., connection establishment and/or peer discovery) is assisted by the base station. Then, two nearby communication devices may communicate (e.g., transmitting/receiving packets) with each other directly according to the D2D communication, and the base station does not need to forwards the packets transmitted between the communication devices.

However, resource allocation for the traditional communication systems cannot be applied to the D2D communication because characteristics of the D2D communication are different from those of the traditional communication systems. Thus, a new resource allocation is needed for the D2D communication.

In addition, the ad-hoc characteristic of the D2D communication introduces a new problem to the resource allocation: truth-telling issue. In more detail, information fed back from communication devices involved in the D2D communication (hereinafter the D2D pair for short) should be honest for the network to allocate the resource efficiently and correctly. However, it is difficult for the network to validate the information because the D2D communications only occur within the D2D pair (or the D2D devices). Thus, the D2D pair may thus be motivated to feed back fake information when the fake information may bring advantages to the D2D pair from the resource allocation. The above situations may happen, when the D2D pair or users of the D2D pair are rational (e.g., selfish). Thus, a problem of the fake information fed back by the D2D pair should be solved.

SUMMARY OF THE INVENTION

The present invention therefore provides a method and related communication device for handling a resource exchange to solve the abovementioned problems.

A method of handling a resource exchange for a network comprises the steps of receiving at least one channel information report transmitted by at least one communication device pair, respectively; determining at least one resource exchange according to the at least one channel information report; and performing the at least one resource exchange on at least one first resource allocated to the at least one communication device pair and on at least one available resource at the network, to allocate at least one second resource to the at least one communication device pair.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 is a table including preference lists of communication device pairs and virtual owners according to an example of the present invention.

DETAILED DESCRIPTION

Figure 1:
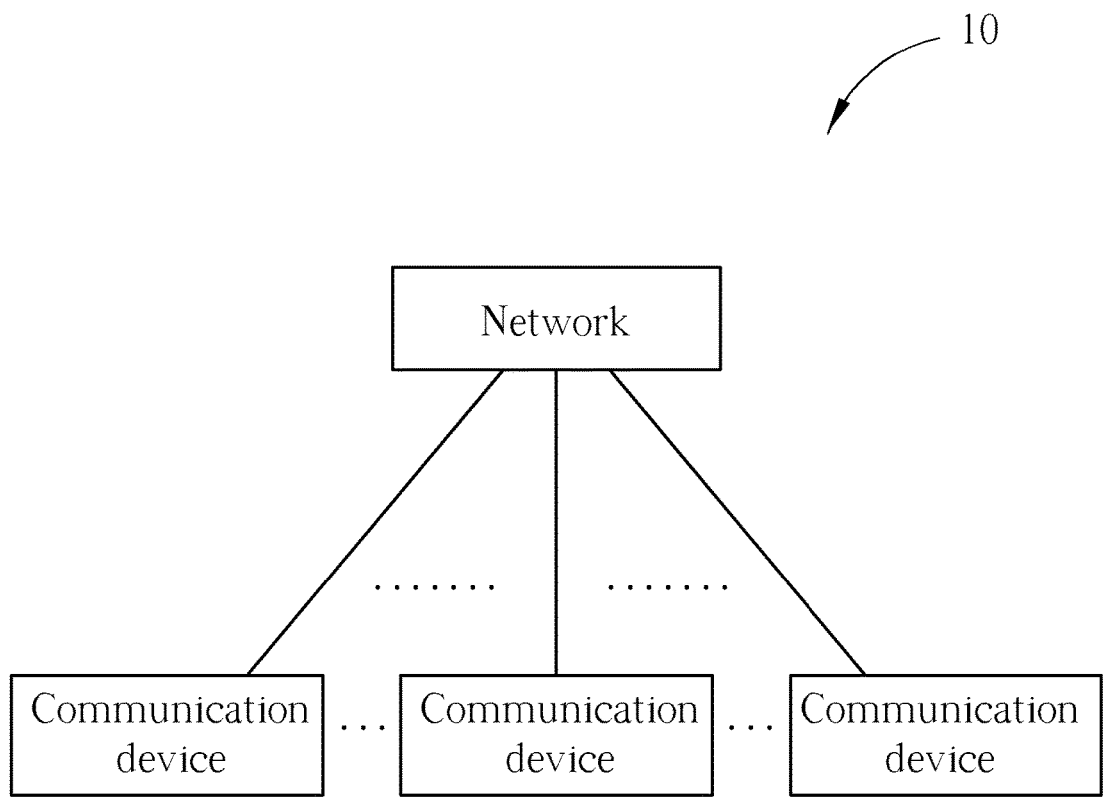
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. In practice, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system. In another example, the network may be a base station in a wireless communication system conforming to wireless standards such as IEEE 802.11, IEEE 802.16, etc.

In addition, two communication devices may communicate with each other directly, after an initialization (e.g., connection establishment and/or peer discovery) is assisted by the network. That is, the communication devices may communicate (e.g., transmitting/receiving packets) with each other according to a device-to-device (D2D) communication, and the communication devices can be denoted as a communication device pair (i.e., a D2D pair) in this situation. Then, interferences (e.g., intra-area interferences and/or inter-area interferences) experienced by the communication devices in the same D2D pair may be similar.

It should be noted that a cell controlled by the network may be divided into one or more service areas. Resources dedicated for the D2D communication may be reused in different service areas to improve resource utilization, while communication device pairs in the same service area can be allocated with different resources to avoid intra-area interference. For example, the communication devices in FIG. 1 may be in a service area of a cell controlled by the network. In another example, the communication devices in FIG. 1 may be in multiple service areas of a cell controlled by the network. The communication device pairs may still be affected by inter-area interference caused by communication device pairs in other service areas or inter-cell interference caused by communication device pairs in other cells allocated with the same resources. In certain situations, a distance between two communication devices in a communication device pair may be significantly smaller than a distance between two communication device pairs, wherein the communication device pairs may in the same or different service areas.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A communication device can be a user equipment (UE), a machine type communication (MTC) device, a mobile phone, a laptop, a tablet computer, an electronic book or a portable computer system. Besides, the network and the communication device can be seen as a transmitter or a receiver according to direction, e.g., for an uplink (UL), the communication device is the transmitter and the network is the receiver, and for a downlink (DL), the network is the transmitter and the communication device is the receiver.

Figure 2:
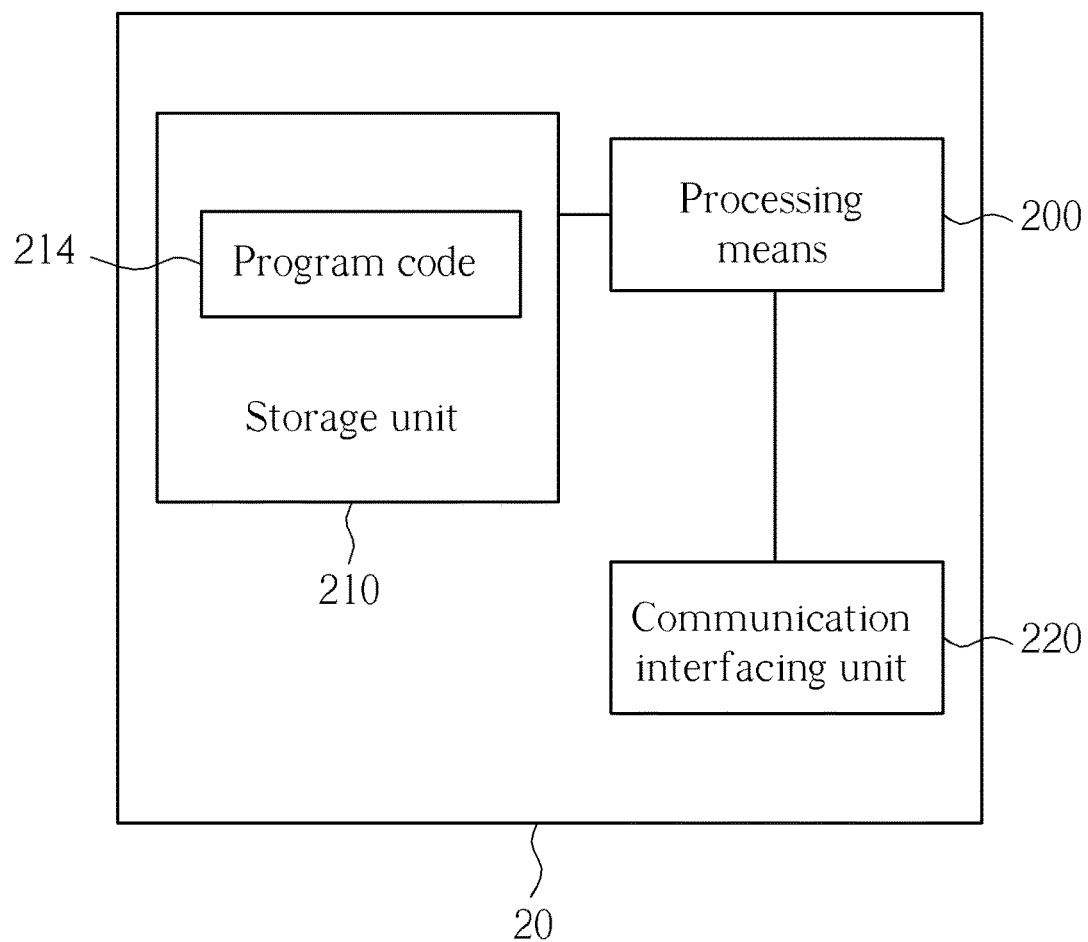
FIG. 2 is a schematic diagram of a communication device according to an example of the present invention.

FIG. 2 is a schematic diagram of a communication device 20 according to an example of the present invention. The communication device 20 can be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
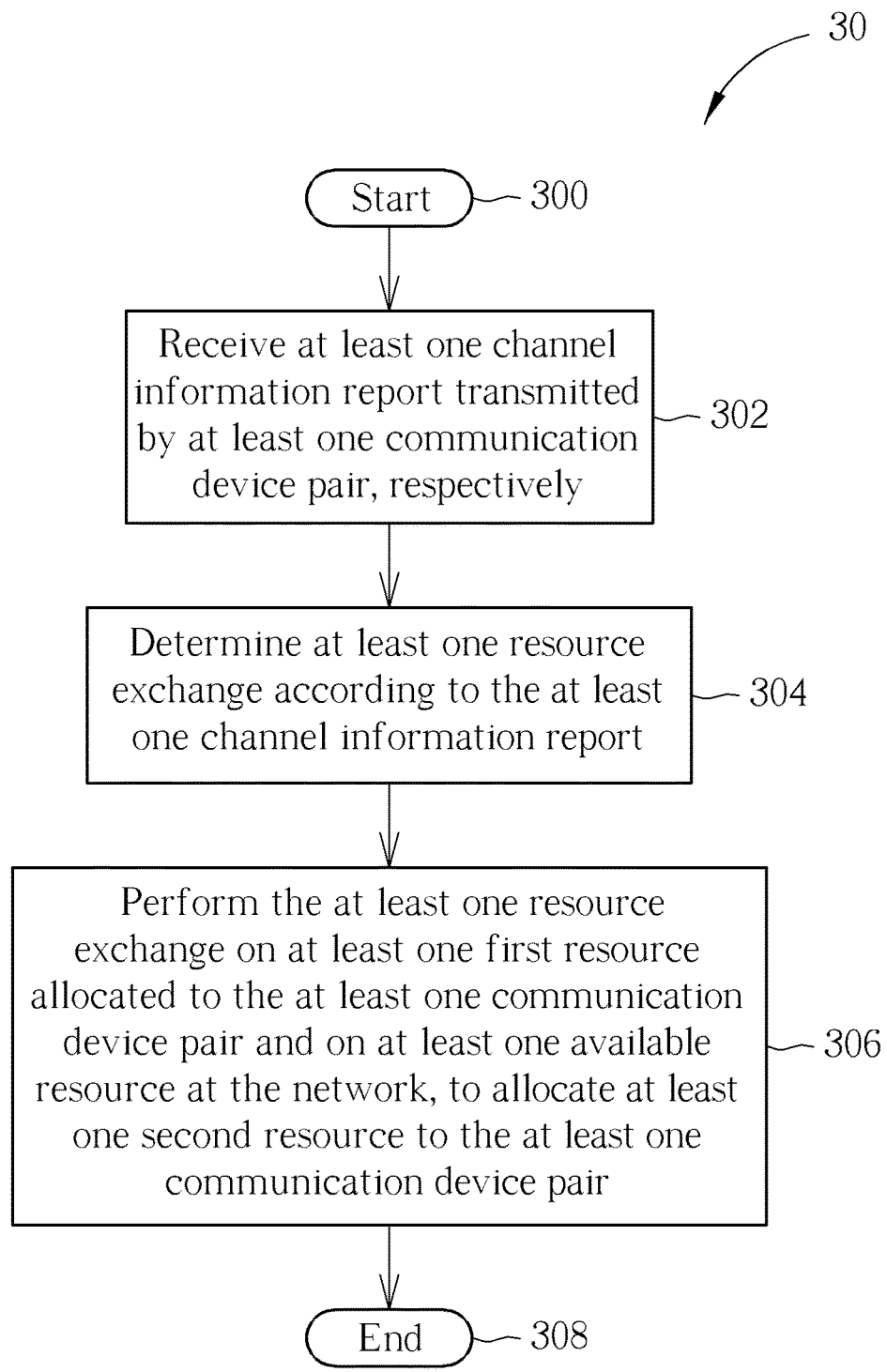
FIG. 3 is a flowchart of a process according to an example of the present invention.

FIG. 3 is a flowchart of a process 30 according to an example of the present invention. The process 30 can be utilized in the network shown in FIG. 1, for handing a resource exchange. The process 30 may be compiled into the program code 214 and includes the following steps:

Step 300: Start.

Step 302: Receive at least one channel information report transmitted by at least one communication device pair, respectively.

Step 304: Determine at least one resource exchange according to the at least one channel information report.

Step 306: Perform the at least one resource exchange on at least one first resource allocated to the at least one communication device pair and on at least one available resource at the network, to allocate at least one second resource to the at least one communication device pair.

Step 308: End.

According to the process 30, the network receives at least one channel information report (e.g., channel quality report, channel quality indicator (CQI)) transmitted by at least one communication device pair, respectively, and determines at least one resource exchange according to the at least one channel information report. Then, the network performs the at least one resource exchange on at least one first resource allocated to the at least one communication device pair and on at least one available resource at the network, to allocate at least one second resource to the at least one communication device pair. In other words, the network coordinates one or more resource exchanges within the communication device pairs and the network according to the channel information reports fed back by the communication device pairs. Note that a resource mentioned above can be one or more resource block groups (RBGs) in the 3rd Generation Partnership Project (3GPP) standard. In addition, the at least one first resource and the at least one second resource may be a plurality of resources dedicated for a D2D communication. The resource exchanges may only be performed within the communication device pairs, if no resource is available at the network. Thus, throughputs of the communication device pairs can be improved after suitable resources (e.g., with fewer interferences) are allocated (e.g., reallocated) to the communication device pairs.

Realization of the present invention is not limited to the above description.

Figure 4:
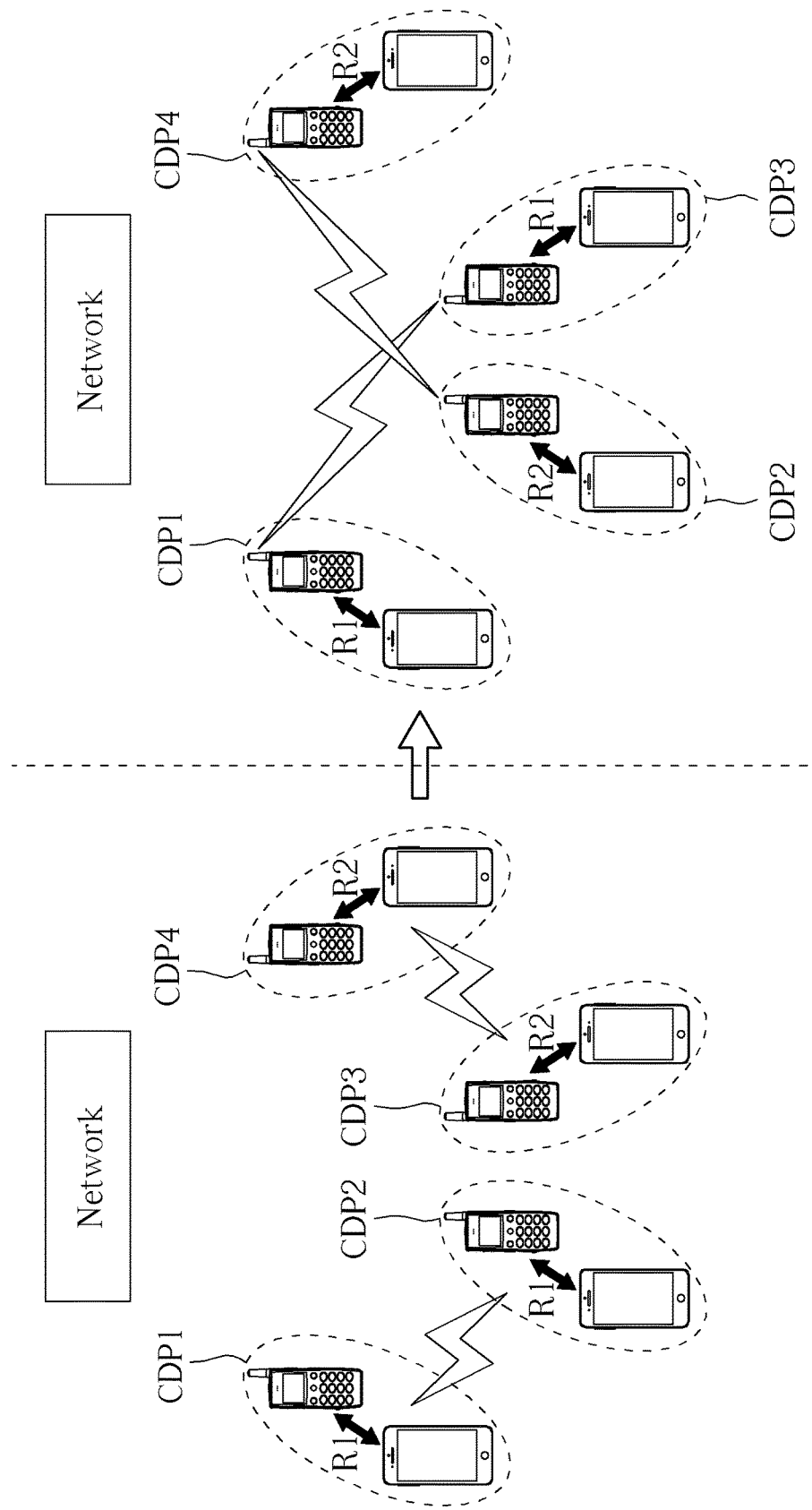
FIG. 4 is a schematic diagram of a resource exchange according to an example of the present invention.

FIG. 4 is a schematic diagram of a resource exchange according to an example of the present invention, wherein communication device pairs CDP1-CDP4 and the network are considered. At first, the communication device pairs CDP1-CDP2 both perform transmissions and/or receptions by using a resource R1, and the communication device pairs CDP3-CDP4 both perform transmissions and/or receptions by using a resource R2. The communication device pairs CDP1-CDP2 may both suffer large interferences, since the communication device pairs CDP1-CDP2 are close to each other and use the same resource R1. Similarly, the communication device pairs CDP3-CDP4 may both suffer large interferences, since the communication device pairs CDP3-CDP4 are close to each other and use the same resource R2. Thus, the network may determine a resource exchange, after receiving channel information reports transmitted by the communication device pairs CDP1-CDP4. As shown in FIG. 4, the resource exchange is that the resources of the communication device pairs CDP2-CDP3 are exchanged. The network may perform the resource exchange on the resources R1-R2 by indicating the resource exchange to the communication device pairs CDP2-CDP3 via a DL control channel (e.g., physical DL control channel (PDCCH)). That is, the network allocates the resources R1-R2 to the communication device pairs CDP3 and CDP2, respectively. In addition, the network may also indicate the communication device pairs CDP1 and CDP4 to keep using the same resources. Then, the communication device pair CDP2 can perform the transmissions/receptions by using the resource R2, and the communication device pair CDP3 can perform the transmissions/receptions by using the resource R1. Since the communication device pairs CDP1-CDP4 are now far from the communication device pairs CDP3, CDP4, CDP1 and CDP2 (i.e., the interfering sources), respectively, the interferences suffered by the communication device pairs CDP1-CDP4 are reduced. Thus, throughputs of the communication device pairs CDP1-CDP4 can be improved.

Note that the communication device pairs CDP2-CDP3 exchange the resources with each other in the above example. In another example, the communication device pairs CDP2-CDP3 may exchange the resources with the network.

Figure 5:
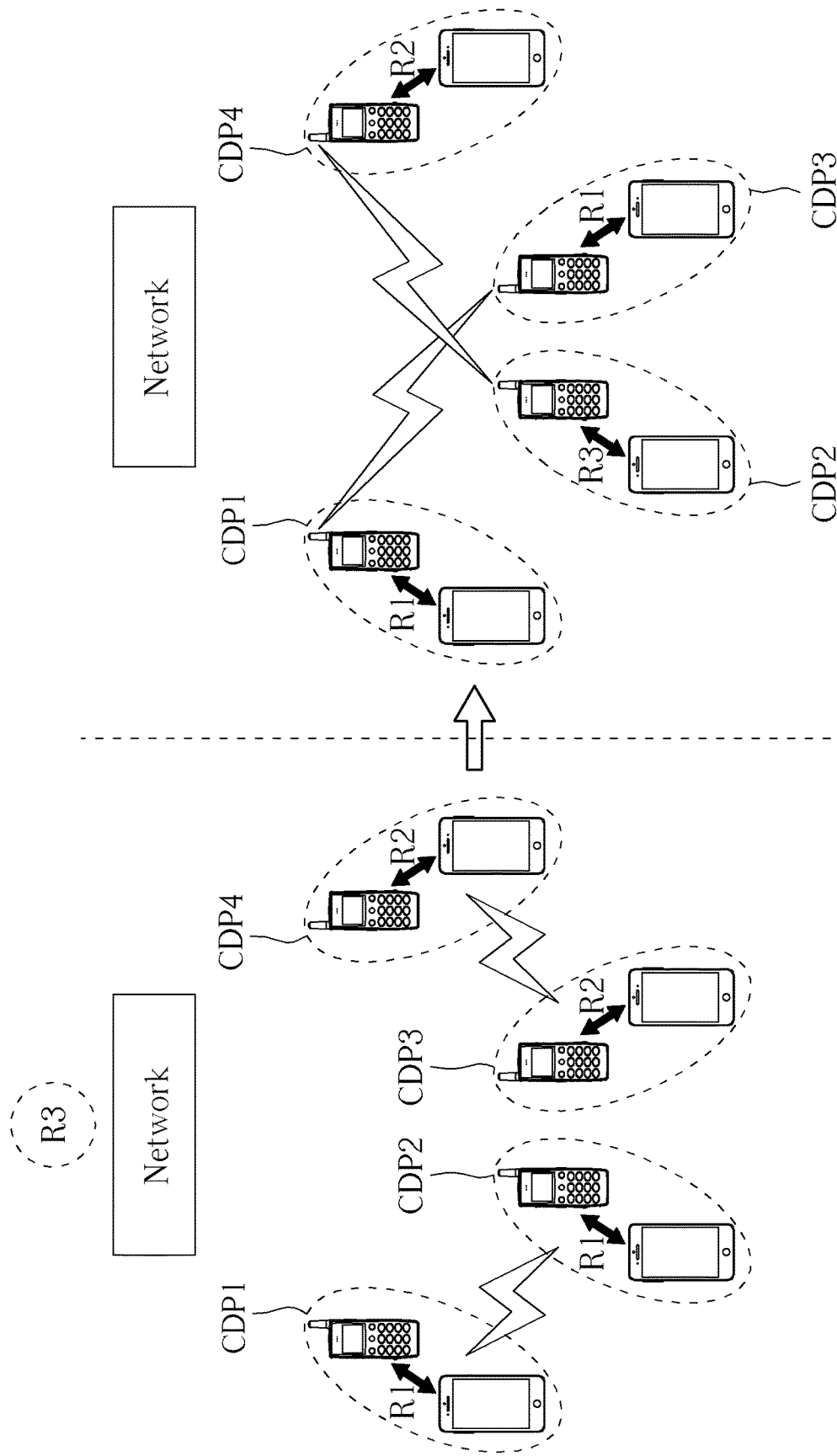
FIG. 5 is a schematic diagram of a resource exchange according to an example of the present invention.

FIG. 5 is a schematic diagram of a resource exchange according to an example of the present invention, wherein communication device pairs CDP1-CDP4 and the network are considered. At first, the communication device pairs CDP1-CDP2 both perform transmissions and/or receptions by using a resource R1, and the communication device pairs CDP3-CDP4 both perform transmissions and/or receptions by using a resource R2. In addition, a resource R3 is available at the network, and is free to being allocated to a communication device pair. The communication device pairs CDP1-CDP2 may both suffer large interferences, since the communication device pairs CDP1-CDP2 are close to each other and use the same resource R1. Similarly, the communication device pairs CDP3-CDP4 may both suffer large interferences, since the communication device pairs CDP3-CDP4 are close to each other and use the same resource R2. Thus, the network may determine a resource exchange {(CDP3, CDP2), (CDP2, network)}, after receiving channel information reports transmitted by the communication device pairs CDP1-CDP4.

As shown in FIG. 5, the resource exchange is that the resources of the communication device pairs CDP2-CDP3 and the network are exchanged. the network may perform the resource exchange on the resources R1-R3 by indicating the resource exchange to the communication device pairs CDP2-CDP3 via a DL control channel (e.g., PDCCH). That is, the network allocates the resources R1 and R3 to The communication device pairs CDP3 and CDP2, respectively. In addition, the network may also indicate the communication device pairs CDP1 and CDP4 to keep using the same resources. Then, the communication device pair CDP2 can perform the transmissions/receptions by using the resource R3, and the communication device pair CDP3 can perform the transmissions/receptions by using the resource R1. Since the communication device pairs CDP1 and CDP3 are now far from the communication device pairs CDP3 and CDP1 (i.e., the interfering sources), respectively, the interferences suffered by the communication device pairs CDP1 and CDP3 are reduced. In addition, the communication device pairs CDP2 and CDP4 suffer no interference now. Thus, throughputs of the communication device pairs CDP1-CDP4 can be improved.

A time instant at which a resource exchange is triggered is not limited herein. For example, a resource exchange can be triggered by the network, when a new communication device pair enters a coverage area (e.g., service area) of the network. In another example, a resource exchange can be triggered by the network, when a communication device pair requests a resource from the network. In another example, a resource exchange can be triggered by the network, when a grant of a resource allocated a communication device pair is terminated (e.g., expired) and the resource is returned to the network. In another example, a resource exchange can be triggered by the network, when one or more communication device pairs update channel information reports. The network may start to determine a resource exchange, when one or more of the above situations occur.

Figure 6:
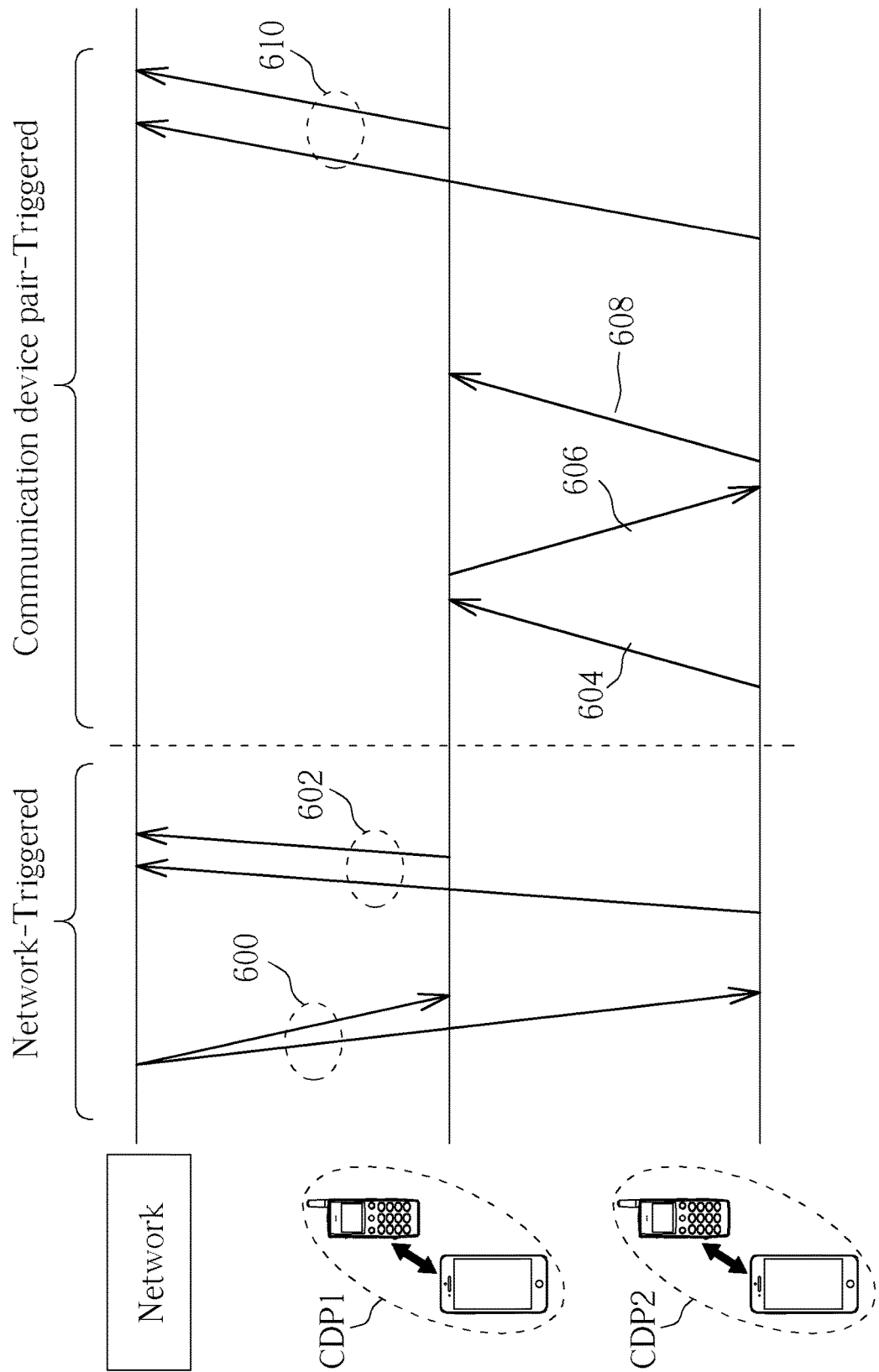
FIG. 6 is a set of flowcharts of processes according to an example of the present invention.

FIG. 6 is a set of flowcharts of processes according to an example of the present invention. The network and communication device pairs CDP1 and CDP2 are shown in FIG. 6. The network may transmit two grants to the communication device pairs CDP1 and CDP2, respectively, to initiate a resource exchange (e.g., via PDCCH(s)) (step 600), when the resource exchange is triggered by the network. The communication device pairs CDP1 and CDP2 may reply acknowledgements to the network to respond the grants (e.g., via physical UL control channel(s) (PUCCH(s))) (e.g., to agree the resource exchange) (step 602), after receiving the grants. In another example, a resource exchange can be triggered by a communication device pair, e.g., the communication device pair CDP2. In this situation, the communication device pair CDP2 transmits an exchange request to the communication device pair CDP1 first (step 604), to initiate a resource exchange. The communication device pair CDP1 transmits an exchange response to the communication device pair CDP2 to respond the exchange request (e.g., to agree the resource exchange) (step 606), after receiving the exchange request. The communication device pair CDP2 may further reply an acknowledgement to the communication device CDP1 to respond the exchange response (step 608), after receiving the exchange response. Then, both of the communication device pairs CDP1 and CDP2 transmit an update of the ownership of the resources to the network (e.g., via PUCCH(s)) (step 610), such that the network can know the result of the resource exchange.

A D2D communication can be initialized according to various methods.

Figure 7:
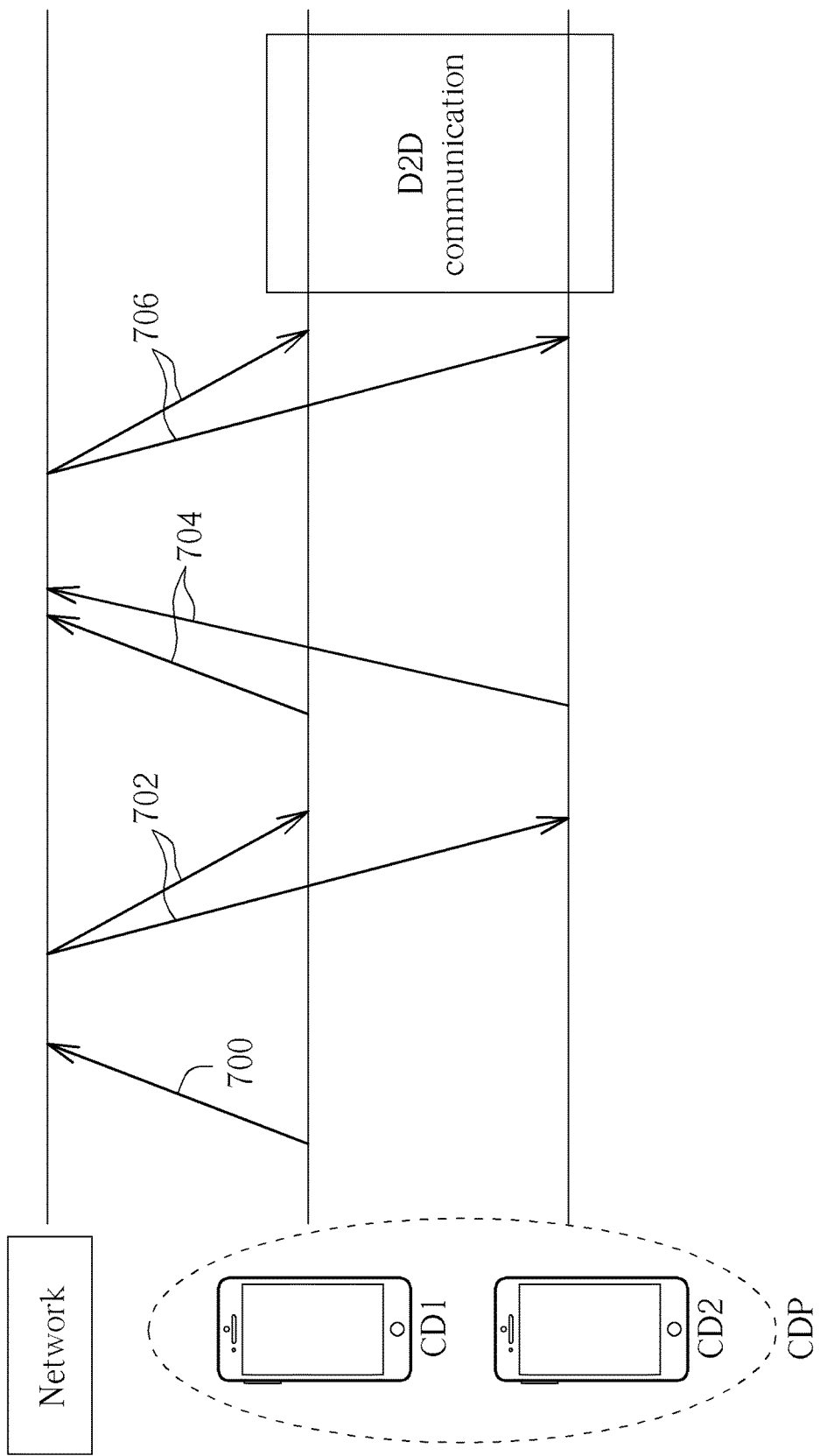
FIG. 7 is a flowchart of a process according to an example of the present invention.

FIG. 7 is a flowchart of a process according to an example of the present invention. The network and a communication device pair CDP which includes two communication devices CD1 and CD2 are shown in FIG. 7. The communication device pair CDP may be identified via performing a peer discovery. Then, one of the communication devices CD1 and CD2 (e.g., the communication device CD1 which may be a head of the communication device pair) triggers a resource granting procedure by transmitting a D2D scheduling request (SR) (e.g., via a dedicated SR resource in a PUCCH) to the network (step 700). The network may transmit a resource grant for requesting channel information reports (e.g., CQIs) and buffer status reports (BSRs) to both of the communication devices CD1 and CD2 (e.g., via PDCCH(s)) if there are unallocated resources at the network (step 702), after receiving the D2D scheduling request. The communication devices CD1 and CD2 may transmit the channel information reports and the BSRs to the network via UL resources (e.g., physical UL shared channel(s) (PUSCH(s))) indicated in the resource grant (step 704). For example, a channel information report may include measurement results related to dedicated resources (e.g., subcarriers) for the D2D communication. In addition, a BSR may include a Quality of Service (QoS) requirement of the communication device pair CDP. Thus, the network can determine an amount of resources reserved for the communication device pair CDP according to the BSR. For example, the network may reserve a specific resource in several frames for the communication device pair CDP according to the BSR. The amount of resource reserved for the D2D communication may be determined according to the expectations in the traffic loading of the system. Finally, the network transmits a resource grant for performing the D2D communication to the communication devices CD1 and CD2 (e.g., via PDCCH(s)) (step 706). Preferably, the network should maintain up-to-date information of channel qualities experienced by the communication device pair CDP. Updates of the channel qualities may be triggered by the network or the communication device pair CDP. A procedure for updating the channel qualities (i.e., the transmission of the channel information reports) is similar to the first part of the procedure for initializing the D2D communication, and is not narrated herein.

A D2D communication can be performed on an unlicensed band or a licensed band. Although an existing wireless technology such as Wi-Fi and Bluetooth can be used for realizing the D2D communication in the unlicensed band, it is relatively unreliable due to interference caused by other devices operating in the same band. On the other hand, dedicated resources for the D2D communication may be allocated (e.g., reserved) to avoid (or to reduce) the interference, if the licensed band is used. For either of the above examples, the network may perform a resource allocation for the D2D communication according to one or more of the following criterions:

(1) preventing communication device pairs and/or other communication devices from being affected by interference caused by the D2D communication;

(2) improving efficiency of the resource allocation according to channel conditions;

(3) reusing time resources and/or frequency resources; and (4) responding timely the requests from communication device pairs, rapid changes in inter/intra-cell interference and/or network reconfigurations.

It should be noted that advantages of the present invention include but are not limited to, what here follows. The present invention can be easily applied to communication systems with structures including a network and one or more communication devices, e.g., Terrestrial Trunked Radio (TETRA), WLAN (e.g., HiperLAN/2 or 802.11), UMTS, LTE, LTE-A, etc. The present invention can be realized flexibly (e.g., in configuration and/or deployment) according to various service/system requirements.

The network may realize step 304 in the process 30 by determining at least one first performance metric corresponding to the at least one first resource and at least one second performance metric corresponding to the at least one second resource according to the at least one channel information report and determining the at least one resource exchange according to the at least one first performance metric and the at least one second performance metric. That is, the network determines performance metrics according to the channel information reports. Then, the network determines the resource exchanges according to the performance metrics. For example, the performance metrics mentioned above may be interferences. In this situation, the performance metrics corresponding to the current resource allocation should not be better (e.g., not be lower) than the performance metrics corresponding to the resource allocation determined according to the resource exchange. Preferably, for each of the communication device pairs involved in the resource exchange, a performance metric corresponding to a resource currently owned by a communication device pair should not be better than a performance metric corresponding to a resource to be allocated to the communication device pair according to the resource exchange. That is, the resource exchange should be beneficial (i.e., remaining the same or becoming better) for each of the communication device pairs. The resource exchanged is termed as a beneficial exchange, if the above description is realized. In another example, the performance metrics mentioned above may be delays and/or bandwidths, and are not limited herein.

Figure 8:
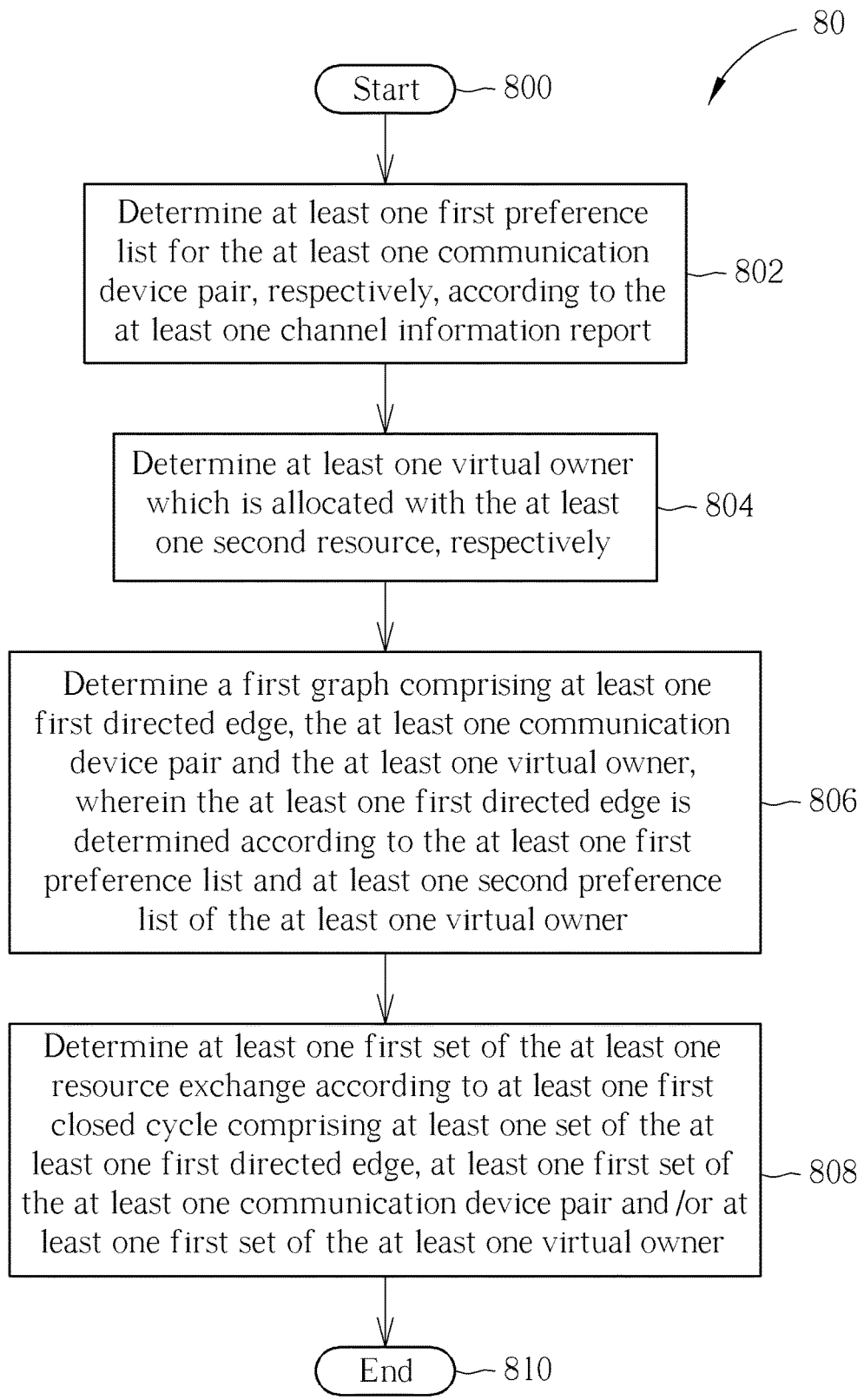
FIG. 8 is a flowchart of a process according to an example of the present invention.

FIG. 8 is a flowchart of a process 80 according to an example of the present invention. The process 80 can be utilized in the network shown in FIG. 1, for realizing step 304 in the process 30. The process 80 may be compiled into the program code 214 and includes the following steps:

Step 800: Start.

Step 802: Determine at least one first preference list for the at least one communication device pair, respectively, according to the at least one channel information report.

Step 804: Determine at least one virtual owner which is allocated with the at least one second resource, respectively.

Step 806: Determine a first graph comprising at least one first directed edge, the at least one communication device pair and the at least one virtual owner, wherein the at least one first directed edge is determined according to the at least one first preference list and at least one second preference list of the at least one virtual owner.

Step 808: Determine at least one first set of the at least one resource exchange according to at least one first closed cycle comprising at least one set of the at least one first directed edge, at least one first set of the at least one communication device pair and/or at least one first set of the at least one virtual owner.

Step 810: End.

According to the process 80, the network determines at least one first preference list for the at least one communication device pair, respectively, according to the at least one channel information report. Then, the network determines at least one virtual owner (i.e., trader) which is allocated with the at least one second resource, respectively. In addition, the network determines a first graph comprising at least one first directed edge, the at least one communication device pair and the at least one virtual owner, wherein the at least one first directed edge is determined according to the at least one first preference list and at least one second preference list of the at least one virtual owner. Finally, the network determines at least one first set of the at least one resource exchange according to at least one first closed cycle comprising at least one set of the at least one first directed edge, at least one first set of the at least one communication device pair and/or at least one first set of the at least one virtual owner. In the process 80, a preference list of a communication device pair includes at least one resource prioritized for the communication device pair, and a preference list of a virtual owner includes at least one resource prioritized for the virtual owner. In addition, a communication device pair emits only a directed edge to a corresponding communication device pair or a corresponding virtual owner, and a virtual owner emits only a directed edge to a corresponding communication device pair or a corresponding virtual owner.

The network may continue to handle the rest of the communication device pairs according the preference lists according to the following steps, if the rest of the communication device pairs are not part of the closed cycles. The network removes the at least one first directed edge and the at least one first closed cycle from the first graph, to determine a second graph comprising at least one second set of the at least one communication device pair and/or at least one second set of the at least one virtual owner. The network determines at least one second directed edge in the second graph according to the at least one first preference list and the at least one second preference list. Then, the network determines at least one second set of the at least one resource exchange according to at least one second closed cycle comprising at least one set of the at least one second directed edge, at least one second set of the at least one communication device pair and/or at least one second set of the at least one virtual owner.

In other words, for each communication device pair (i.e., vertex), the network determines (i.e., generates) a directed edge from a communication device pair to a target communication device pair according to a preference list of the communication device pair. Accordingly, a graph including communication device pairs and directed edges is formed. Preferably, the network may determine a directed edge from a communication device pair to a target communication device pair having the most preferred resource in a preference list of the communication device pair, when the graph is formed.

Then, the network searches closed cycles in the graph. There should be at least one closed cycle because each communication device pair emits only one directed edge. For each closed cycle, the network determines that the communication device pairs in the closed cycle exchange their resources with each other according to the directed edges of the closed cycle. That is, resource exchanges between communication device pairs in a closed cycle can be determined according to directed edges of the closed cycle. Then, the network removes the communication device pairs with the corresponding closed cycle from the graph. In addition, it is possible that the network generates a directed edge from a communication device pair to the communication device pair itself. For example, the communication device pair already has the most preferred resource. In such a case, the network can remove the communication device pair from the graph. That is, a directed edge is also considered as a closed cycle, if the source vertex and the destination vertex are the same.

Similarly, for each of remaining communication device pairs, the network generates a directed edge from a communication device pair to a target communication device pair according to a preference list of the communication device pair. Accordingly, a new graph including the remaining communication device pairs and directed edges is formed. Note that the network may generate a directed edge from a communication device pair to a target communication device pair having the second preferred resource in a preference list of the communication device pair, when the target communication device pair having the most preferred resource in the preference list of the communication device pair is removed. In other words, a directed edge from a communication device pair to a target communication device pair is determined according to a preference list of the communication device pair and communication device pairs (i.e., resources) remained in the present graph. As can be seen, the directed edges of the remaining communication device pairs in the present graph may be different from the directed edges of the remaining communication device pairs in the previous graph, since some communication device pairs were removed in the previous graph.

Then, the network searches closed cycles in the graph according to the previous description, and is not narrated herein. Similarly, for each closed cycle, resource exchanges between communication device pairs in a closed cycle can be determined according to directed edges of the closed cycle. The network continues the above process until all the communication device pairs are removed or only a single communication device pair is left. Thus, resource exchanges for all the communication device pairs are determined. The network is able to perform the resource exchanges on the resources, to allocate (or reallocate) the resources.

The above method is related to an example where there are one or more available resources at the network. Thus, virtual owners are needed for those available resources.

On the other hand, the method can also be applied to the case where there is no available resource at the network, after some modifications are made. In this situation, no virtual owner is needed to be created. That is, the process 80 can be modified to realize step 304 in the process 30 as follows. The network determines at least one preference list for the at least one communication device pair, respectively, according to the at least one channel information report. In addition, the network determines a first graph comprising at least one first directed edge and the at least one communication device pair, wherein the at least one first directed edge is determined according to the at least one preference list. Finally, the network determines at least one first set of the at least one resource exchange according to at least one first closed cycle comprising at least one set of the at least one first directed edge and at least one first set of the at least one communication device pair. In addition, a preference list of a communication device pair comprises at least one resource prioritized for the communication device pair, and a communication device pair emits only a directed edge to a corresponding communication device pair.

The network may continue to handle the rest of the communication device pairs according the preference lists according to the following steps, if the rest of the communication device pairs are not part of the closed cycles. The network removes the at least one first directed edge and the at least one first closed cycle from the first graph, to determine a second graph comprising at least one second set of the at least one communication device pair. The network determines at least one second directed edge in the second graph according to the at least one preference list. Then, the network determines at least one second set of the at least one resource exchange according to at least one second closed cycle comprising at least one set of the at least one second directed edge and at least one second set of the at least one communication device pair. Since the method where no virtual owner exists can be obtained from the method without considering the virtual owner and its preference list, detail of the method should readily be obtained by those skilled in the art and is not narrated herein.

Figure 9:
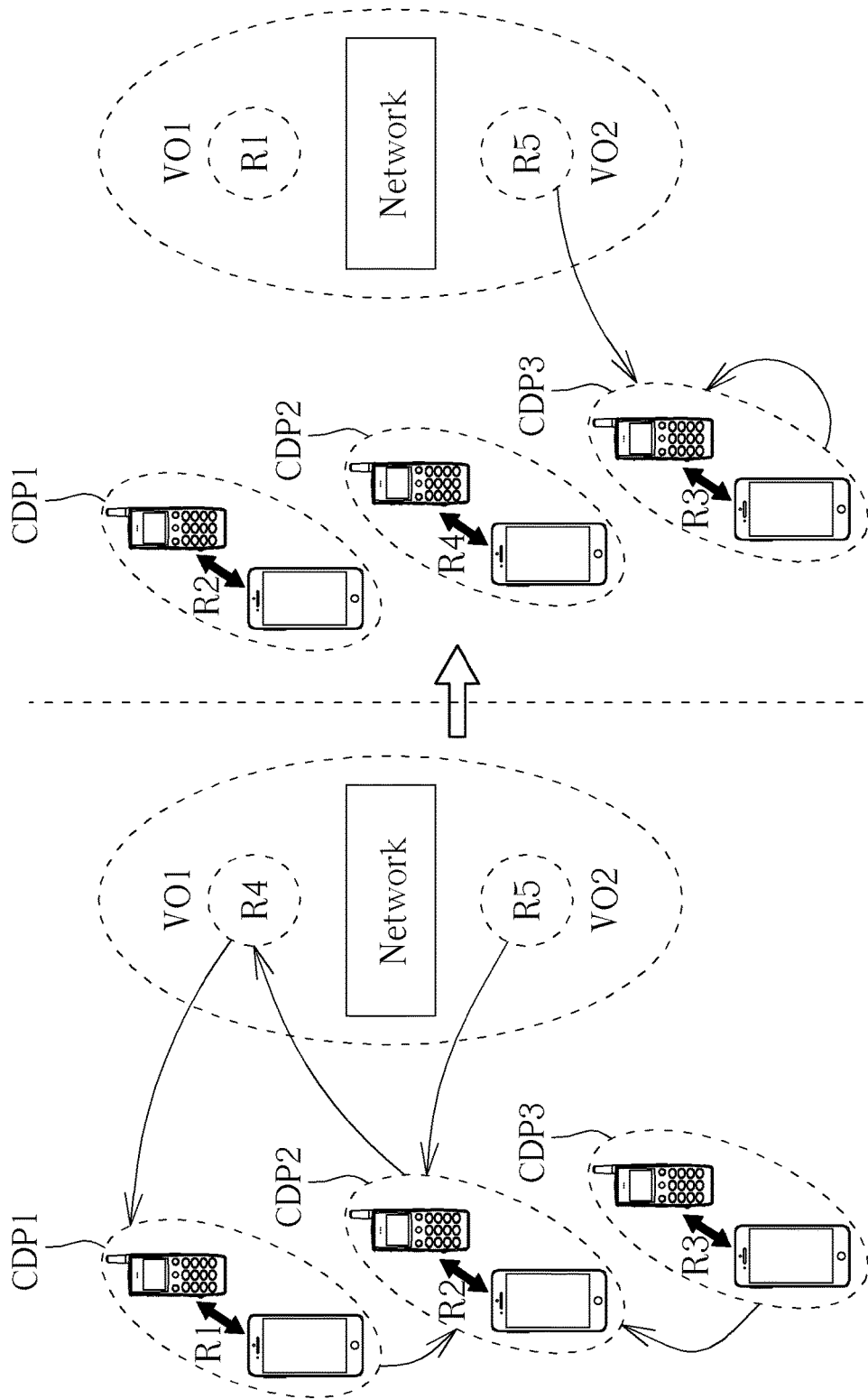
FIG. 9 is a schematic diagram of a resource exchange according to an example of the present invention.

FIG. 9 is a schematic diagram of a resource exchange according to an example of the present invention, wherein communication device pairs CDP1-CDP3 and the network are considered. In addition, the communication device pairs CDP1-CDP3 own resources R1-R3, respectively, and resources R4-R5 are available at the network. Further, the network determines that virtual owners VO1-VO2 own the resources R4-R5, respectively. FIG. 10 is a table 100 including preference lists of communication device pairs and virtual owners according to an example of the present invention. For example, a preference list of the communication device pair CDP1 indicates that the preferences regarding the resources from high to low are the resources R2, R1, R3, R4 and R5. The network may determine the table 100 according to channel information reports transmitted by the communication devices pair CDP1-CDP3.

In the first step, the network determines directed edges according to the preference lists as follows. The communication device pairs CDP1-CDP3 emit directed edges to the communication device pair CDP2, the virtual owner VO1 and the communication device pair CDP2, respectively, according to the preference lists of the communication device pairs CDP1-CDP3 in the table 100. The virtual owners VO1-VO2 emit directed edges to the communication device pair CDP1 and the communication device pair CDP2, respectively, according to the preference lists of the virtual owners VO1-VO2 in the table 100. Thus, a graph including the communication device pairs CDP1-CDP3, the virtual owners VO1-VO2 and the corresponding directed edges is formed. The network can determine a resource exchange {(CDP1, CDP2), (CDP2, VO1)} according to the directed edges forming a closed cycle, as shown in the right-hand side of FIG. 9. Then, the network removes the closed cycle including the communication device pairs CDP1-CDP2, the virtual owner VO1 and the corresponding directed edges from the graph.

In the second step, the network determines directed edges for the remaining communication device and the remaining virtual owner according to the preference lists as follows. The communication device pair CDP3 and the virtual owner VO2 both emit directed edges to the communication device pair CDP3, according to the preference lists of the communication device pair CDP3 and the virtual owner VO2 in the table 100. Thus, a graph including the communication device pair CDP3, the virtual owner VO2 and the corresponding directed edges is formed. Since the communication device pair CDP3 emits the directed edge to itself, the directed edge is considered as a closed cycle. That is, the communication device pair CDP3 already has the most preferred resource which is the resource R3. The network can determine a resource exchange {(CDP3, CDP3)} which means no resource exchange according to the directed edge forming the closed cycle. Then, the network removes the closed cycle including the communication device pair CDP3 from the graph. In addition, the network further determines a resource exchange {(VO2, VO2)} since only the virtual owner VO2 is left.

As can be seen, all the resource exchanges are determined, and a resource allocation can be performed according to the resource exchanges.

It should be noted that a preference list of a virtual owner can be determined according to various methods. For example, the preference list of the virtual owner can be determined according to preference lists of communication device pairs. In one example, the virtual owner can emit a directed edge to a communication device pair such that a closed cycle can be formed. Preferably, the closed cycle is the largest cycle in a graph such that more communication device pairs and/or virtual owners can be removed from the graph. In another example, the preference list of the virtual owner can be determined randomly.

However, the network may determine a resource exchange between a virtual owner and another virtual owner frequently in certain situations. The resource exchange between the virtual owners is not efficient, since resources of the virtual owners are actually owned by the network. Thus, a resource exchange between the virtual owners brings no benefit to the communication device pairs. To mitigate this problem, the network may determine that in a preference list of a virtual owner, a priority of a resource of a communication device pair is higher than a priority of a resource at the network. That is, in a preference list of a virtual owner, priorities of resources of communication device pairs are higher than priorities of resources of virtual owners. Thus, the virtual owner will exchange its resource with a communication device pair with a higher probability. Accordingly, there are more opportunities for a communication device pair to exchange its resource with a virtual owner.

In addition, a communication device pair may perform a transmission and/or a reception with the network, as stated in the above description. A method according to which the communication device pair performs the transmission and/or the reception is not limited herein. For example, a head (e.g., leader or group owner) of the communication device pair may perform the transmission and/or the reception with the network, if the communication device pair intends to communicate with the network. In another example, either one of communication devices in the communication device pair may perform the transmission and/or the reception with the network, if the communication device pair intends to communicate with the network.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling resource exchange. Thus, throughputs of the communication device pairs can be improved after suitable resources (e.g., with fewer interferences) are allocated (e.g., reallocated) to the communication device pairs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a resource exchange for a network comprising the steps of:
   receiving at least one channel information report transmitted by at least one communication device pair, respectively;
   determining at least one resource exchange between the at least one communication device pair and the network according to the at least one channel information report; and
   performing the at least one resource exchange on at least one first resource allocated to the at least one communication device pair and on at least one available resource at the network, to allocate at least one second resource to the at least one communication device pair;
   wherein the network determines the at least one resource exchange by:
   determining at least one first preference list for the at least one communication device pair, respectively, according to the at least one channel information report;
   determining at least one virtual owner which is allocated with the at least one second resource, respectively;

determining a first graph comprising at least one first directed edge, the at least one communication device pair and the at least one virtual owner, wherein the at least one first directed edge is determined according to the at least one first preference list and at least one second preference list of the at least one virtual owner; and determining at least one first set of the at least one resource exchange according to at least one first closed cycle comprising at least one set of the at least one first directed edge, at least one first set of the at least one communication device pair and/or at least one first set of the at least one virtual owner;

wherein a preference list of a communication device pair comprises at least one resource prioritized for the communication device pair, and a preference list of a virtual owner comprises at least one resource prioritized for the virtual owner;

wherein a communication device pair emits only a directed edge to a corresponding communication device pair or a corresponding virtual owner, and a virtual owner emits only a directed edge to a corresponding communication device pair or a corresponding virtual owner.

2. The method of claim 1, further comprising:

removing the at least one first directed edge and the at least one first closed cycle from the first graph, to determine a second graph comprising at least one second set of the at least one communication device pair and/or at least one second set of the at least one virtual owner;

determining at least one second directed edge in the second graph according to the at least one first preference list and the at least one second preference list; and determining at least one second set of the at least one resource exchange according to at least one second closed cycle comprising at least one set of the at least one second directed edge, at least one second set of the at least one communication device pair and/or at least one second set of the at least one virtual owner.

3. The method of claim 1, wherein the at least one second preference list is determined according to the at least one first preference list.

4. The method of claim 1, wherein the at least one second preference list is determined randomly.

5. The method of claim 1, wherein in the preference list of the virtual owner, a priority of a resource of one of the at least one communication device pair is higher than a priority of a resource at the network.

6. The method of claim 1, wherein the at least one first resource and the at least one second resource are a plurality of resources dedicated for a device-to-device (D2D) communication.

7. The method of claim 1, wherein the at least one first resource and the at least one available resource are different resources.

8. The method of claim 1, wherein the at least one second resource does not comprise the at least one available resource.

9. The method of claim 1, wherein the at least one first resource and the at least one second resource are a plurality of resource block groups, respectively.

10. A method of handling a resource exchange for a network comprising the steps of:

receiving at least one channel information report transmitted by at least one communication device pair, respectively;

determining at least one resource exchange between the at least one communication device pair and the network according to the at least one channel information report; and performing the at least one resource exchange on at least one first resource allocated to the at least one communication device pair and on at least one available resource at the network, to allocate at least one second resource to the at least one communication device pair;

wherein the network determines the at least one resource exchange by:

determining at least one preference list for the at least one communication device pair, respectively, according to the at least one channel information report;

determining a first graph comprising at least one first directed edge and the at least one communication device pair, wherein the at least one first directed edge is determined according to the at least one preference list; and determining at least one first set of the at least one resource exchange according to at least one first closed cycle comprising at least one set of the at least one first directed edge and at least one first set of the at least one communication device pair;

wherein a preference list of a communication device pair comprises at least one resource prioritized for the communication device pair, and a communication device pair emits only a directed edge to a corresponding communication device pair.

11. The method of claim 10, further comprising:

removing the at least one first directed edge and the at least one first closed cycle from the first graph, to determine a second graph comprising at least one second set of the at least one communication device pair;

determining at least one second directed edge in the second graph according to the at least one preference list; and determining at least one second set of the at least one resource exchange according to at least one second closed cycle comprising at least one set of the at least one second directed edge and at least one second set of the at least one communication device pair.

12. The method of claim 10, wherein the at least one first resource and the at least one second resource are a plurality of resources dedicated for a device-to-device (D2D) communication.

13. The method of claim 10, wherein the at least one first resource and the at least one available resource are different resources.

14. The method of claim 10, wherein the at least one second resource does not comprise the at least one available resource.

15. The method of claim 10, wherein the at least one first resource and the at least one second resource are a plurality of resource block groups, respectively.

* * * * *